United States Patent [19]

Fritts et al.

[11] Patent Number: 5,082,567
[45] Date of Patent: Jan. 21, 1992

[54] REGENERATION OF CATIONIC EXCHANGE RESINS

[75] Inventors: Sharon D. Fritts, Youngstown; Tilak V. Bommaraju, Grand Island, both of N.Y.

[73] Assignee: Occidental Chemical Corporation, Niagara Falls, N.Y.

[21] Appl. No.: 610,626

[22] Filed: Nov. 8, 1990

[51] Int. Cl.$^5$ ............................................. B01D 15/04
[52] U.S. Cl. ................................... 210/673; 210/686; 521/26
[58] Field of Search .................... 210/673, 686; 521/26

[56] References Cited

U.S. PATENT DOCUMENTS 4,335,000  6/1982  Grier et al. .......................... 210/684
4,486,390  12/1984  Schmiedel ........................... 210/673

FOREIGN PATENT DOCUMENTS 60-0077982A2  5/1985  Japan.

OTHER PUBLICATIONS

"Oxygen Atom Transfer in the Reaction of Chlorate with Sulfite in Aqueous Solution", Halperin, J. and Taube, H., J. Am. Chem. Soc. 72, pp. 3319–3320 (1952).

*Primary Examiner*—Ivars Cintins

[57] ABSTRACT

Disclosed is a method of regenerating a cationic exchange resin that has been exposed to chlorate ion. The resin is treated with an acidic regenerating solution that contains sulfite ion in an amount at least stoichiometric with the amount of chlorate remaining on the resin. The resin can either be rinsed with water first and then contacted with an acidic regenerating solution containing sulfite, or the resin can be washed with acidic water containing sulfite ion and then treated with an acidic regenerating solution.

12 Claims, No Drawings

REGENERATION OF CATIONIC EXCHANGE RESINS

BACKGROUND OF INVENTION

This invention relates to the regeneration of cationic exchange columns that have been exposed to the chlorate ion. In particular, it relates to the use of sulfite ion during the regeneration of the resin with acid to prevent the formation of chlorine and chlorine dioxide.

Cationic exchange columns can be used to remove undesirable cations, such as calcium and magnesium ions, from liquors that contain chlorate ions. For example, in the electrolysis of sodium chloride, a sodium chloride brine containing small amounts of chlorate can be passed through an ion exchange column to remove calcium and magnesium. Also, in the electrolysis of brine to form chlorate, the recycled sodium chlorate solution, which may contain more than 30% chlorate, can be passed through an ion exchange column to prevent the buildup of calcium and magnesium.

After the cation exchange resin has become exhausted, the resin is regenerated by rinsing with water, replacing the calcium and magnesium on the resin with hydrogen by passing acid through the resin, and, if the sodium form is desired, replacing the hydrogen with sodium by passing a solution of sodium hydroxide through the resin.

However, occasionally the resin will not be thoroughly rinsed and some chlorate will remain on it. Even with several thorough water rinses it is difficult to remove all of the chlorate from the column. If chlorate remains on the column the acid used to condition the column can react with the chlorate remaining on the column to form chlorine gas and chlorine dioxide gas. Chlorine gas can react with the ion exchange resin to degrade it, resulting in a loss of resin capacity. Chlorine dioxide is considered to be a highly dangerous gas because it can explode spontaneously. Until now, no one has found a good way to prevent the formation of chlorine and chlorine dioxide during the regeneration of cationic exchange columns that have been exposed to chlorate.

SUMMARY OF THE INVENTION

We have discovered that the formation of chlorine and chlorine dioxide gases during the regeneration of cationic exchange columns that have been exposed to chlorate can be reduced or prevented entirely if the resin is exposed to a small amount of sulfite before or during the acid treatment portion of the reconditioning. It is surprising that a small amount of sulfite can prevent the formation of these gases in the presence of large amounts of acid which react with chlorate to generate the gases. That is, for example, hydrochloric acid reacts with sodium chlorate to form chlorine and chlorine dioxide according to the reaction:

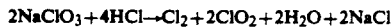
$$2NaClO_3 + 4HCl \rightarrow Cl_2 + 2ClO_2 + 2H_2O + 2NaCl$$

The sulfite ion also reacts with chlorate, but the reaction does not result in the formation of the chlorine or chlorine dioxide:

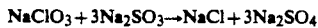
$$NaClO_3 + 3Na_2SO_3 \rightarrow NaCl + 3Na_2SO_4$$

However, since the hydrochloric acid is present in an amount of about 15 wt % and the bisulfite ion is present in an amount of less than 2 wt %, it is surprising that the small amount of bisulfite can prevent the large amount of hydrochloric acid from forming the gases.

DESCRIPTION OF THE INVENTION

The method of this invention may be applied to treat any cationic exchange resin that has been exposed to chlorate ion. While one would normally attempt to wash the resin thoroughly before regenerating it with acid, occasionally the rinsing will not be as thorough as is necessary. In view of the severe effects which can result from the presence of chlorate on the resin during regeneration, it is desirable to practice the method of this invention when any cationic exchange resin that has been exposed to chlorate is regenerated with acid.

Since the acid reacts with the chlorate to form the chlorine and chlorine dioxide gases, the resin should never be exposed to acid prior to exposure to the bisulfite ion. That is, the resin should be treated with sulfite either before or contemporaneously with the acid. For example, the resin can be rinsed with an acidic (e.g., pH of about 1 to about 6) solution containing about a stoichiometric amount of sulfite ion up to saturation followed by treatment with the acid regenerant. The preferred procedure, however, is, after the column has been rinsed with water, to treat the column with an acid regenerant that contains about 0.1 to about 2 wt % sulfite because that method of treatment requires less capital equipment. Typically, the column is washed several times with water, then the acid regenerant is recirculated several times through the resin. While the resin can be left in the acid form is desired, it is usually converted to the alkali metal (sodium or potassium) form. This can be accomplished, for example, by passing sodium hydroxide through the resin until the pH of the wash is greater than 7.

Regeneration can be performed at ambient temperatures, which may vary considerably with the climate as some of the treatment facilities may be outdoors.

The acid regenerant is preferably hydrochloric acid as it adds only chloride ions to the regeneration fluids, but other acids, such as sulfuric acid, can also be used. Any source of sulfite ion can be used, such as alkali metal or ammonium sulfite or bisulfite. One can also use sulfur dioxide or sulfurous acid ($H_2SO_3$). If sulfur dioxide or sulfurous acid is used, it acts both as the source of sulfite ion and as the acid regenerant. However, sodium bisulfite and hydrochloric acid are preferred because they are inexpensive and sodium ions are often present anyway.

The following examples further illustrate this invention:

EXAMPLE 1

A cationic exchange resin, "Duolite C-467" sold by Rohm & Haas, was treated with 15% HCl solution to determine its capacity, which was determined to be 8.4 eq/l dry H-form resin with a 39.2% solids content.

A second batch of the same resin was mixed with a mother liquor solution that consisted of 10.0 wt % sodium chloride, 36.6 wt % sodium chlorate, 1.7 wt % sodium sulfate, and 0.35 wt % sodium dichromate. The resin (20 cc.) was conditioned with 200 cc. of 15 wt % HCl and 2 wt % NaHSO$_3$, without rinsing. The pungent odor of chlorine and the malodorous stench of sulfur dioxide were noted. The resin was then treated with NaOH to put it into the sodium form. The resin turned a deep taupe color which may be due to degradation of the resin, or it may be due to reduction of the dichromate in the chlorate solution. The resin was then conditioned with 15% HCl and its cation exchange capacity was determined to be 6.2 eq/l dry H-form resin, indicating a loss of capacity; the solids content was 38.9%. In this experiment, only 54% of the estimated stoichiometric amount of sodium bisulfite required to kill the chlorate was added.

In a third experiment, 20 cc. of the same resin was mixed with the same mother solution then rinsed three times with 20 cc. water each time. The first rinse water contained 184.5 g/L sodium chlorate, the second rinse water contained 51.5 g/L sodium chlorate, and the third rinse water contained 3.41 g/L of sodium chlorate. The resin was conditioned with 200 cc. of 15% HCl and 2% $NaHSO_3$, then rinsed and treated with NaOH. The mother liquor treatment-regeneration cycle was repeated two more times. No color change on the resin was observed, indicating that the resin did not degrade. The cation exchange capacity of the resin was determined to be 9.2 eq/l dry H-form resin, indicating no loss of capacity, with a solids content of 39.3%. The amount of sodium bisulfite added in this experiment was estimated to be 4.6 times the stoichiometric amount required to kill the sodium chlorate remaining on the resin after the third rinse, while the amount of HCl present was 138 times the amount needed to stoichiometrically react with the remaining sodium chlorate.

These experiments indicate that if a cation exchange resin that has been exposed to chlorate is conditioned with an acid containing sulfite, the resin will not lose capacity during regeneration. Since the resin did not lose capacity, this example shows that no chlorine was formed during conditioning.

EXAMPLE 2

This experiment was designed to determine whether any chlorine dioxide would form when the sodium bisulfite/hydrochloric acid mixture was added to a dilute chlorate solution in the absence of a resin. Two volumes of the conditioning solution, containing 2% sodium sulfite and 15% hydrochloric acid were added to one volume of 10 g/L sodium chlorate. These volume ratios approximate the ratio of chlorate-generating rinse water held up on the column in Example 1 (45 cc. water per 100 cc. resin) and the amount of hydrochloric acid that would be added to the resin while the column is being filled with acid. Note that the amount of sodium bisulfite is only 1.1 times the stoichiometric amount required to kill the chlorine in the solution.

After the hydrochloric acid/sodium bisulfite was allowed to react with the chlorate, bleach was added to the solution to destroy any remaining sodium bisulfite. The solution was then sparged with nitrogen to carry the dissolved chlorine and chlorine dioxide, if any was formed, into a potassium iodine scrubber. The potassium iodine solution was titrated to determine the chlorine and chlorine dioxide content. From Example 1 it was known that no chlorine formed under these circumstances and in this experiment no chlorine dioxide was detected either. Also, in this experiment the amount of HCl used was 46 times as much as needed to react with the sodium chlorate, while the amount of sodium sulfite was only 1.1 times as much as needed to react with the chlorate.

As a control, the experiment was repeated except that sodium bisulfite was not added to the hydrochloric acid.

The solution was again sparged into the potassium iodine scrubber then titrated for both chlorine and chlorine dioxide. Both gases were detected. This experiment demonstrates that no chlorine dioxide is dissolved in the solution after the addition of hydrochloric acid/sodium bisulfite mixture for regeneration, as long as the amount of sulfite in the acid is at or above the stoichiometric quantity need to react with the chlorate remaining on the resin.

We claim:

1. In a process for treating a solution that contains chlorate ions with a cationic exchange resin, thereby producing a chlorate ion containing cationic exchange resin, a method of regenerating the chlorate ion containing cationic exchange resin comprising treating said resin with an acidic regenerating solution containing sulfite in an amount at least stoichiometric with the amount of chlorate on said resin.

2. The method of claim 1 wherein said acidic regeneration solution contains hydrochloric acid.

3. The method of claim 2 wherein said acidic regenerating solution comprises about 8 to about 15 wt % hydrochloric acid and about 0.1 to about 2 wt % sulfite.

4. The method of claim 3 wherein said sulfite is sodium bisulfite.

5. A method according to claim 1 including the additional last step of treating said resin with an alkali metal hydroxide.

6. A method of regenerating a cationic exchange resin that has been used to remove cations from water containing chlorate ions, and which now contains said cations and said chlorate ions comprising
    (1) rinsing said resin with water; and
    (2) contacting said resin with an aqueous acidic sulfite solution.

7. A method according to claim 6 wherein said solution comprises about 8 to about 15 wt % hydrochloric acid and about 0.1 to about 2 wt % sulfite.

8. A method according to claim 7 wherein said sulfite is sodium bisulfite.

9. A method of regenerating a cationic exchange resin that has been used to remove cations from water containing chlorate ions, and which now contains said cations and said chlorate ions comprising
    (1) rinsing said resin with acidic water containing sulfite ion; and
    (2) treating said resin with an acidic regenerating solution.

10. A method according to claim 9 wherein said acidic regenerating solution comprises about 8 to about 15 wt % hydrochloric acid and about 0.1 to about 2 wt % sulfite.

11. A method according to claim 10 wherein said sulfite is sodium bisulfite.

12. A method of regenerating a cationic exchange resin that has been used to remove cations from water containing chlorate ions, and which now contains said cations and said chlorate ions comprising
    (1) rinsing said resin several times with water;
    (2) converting said resin to the acid form by passing through said resin an aqueous acidic regenerating solution which comprises about 8 to about 15 wt % hydrochloric acid and about 0.1 to about 2 wt % sulfite; and
    (3) converting said resin to the alkali metal form by passing a solution of an alkali metal hydroxide through said resin.

* * * * *